(12) United States Patent
Benge et al.

(10) Patent No.: US 10,650,081 B2
(45) Date of Patent: May 12, 2020

(54) TELEVISION APPLICATION PAGE TRACKING USING DECLARATIVE PAGE TRACKING

(71) Applicant: ADOBE INC., San Jose, CA (US)

(72) Inventors: David Benge, Poulsbo, WA (US); Dylan DePass, Toronto (CA)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/247,799

(22) Filed: Aug. 25, 2016

(65) Prior Publication Data

US 2018/0060444 A1 Mar. 1, 2018

(51) Int. Cl.
G06F 16/958 (2019.01)
H04L 29/08 (2006.01)
G06F 11/34 (2006.01)

(52) U.S. Cl.
CPC ........ G06F 16/986 (2019.01); G06F 11/3438 (2013.01); H04L 67/22 (2013.01)

(58) Field of Classification Search
CPC .............................. H04L 67/22; G06F 11/3438
See application file for complete search history.

(56) References Cited

U.S. PATENT DOCUMENTS

| | | | | |
|---|---|---|---|---|
| 6,519,771 B1 * | 2/2003 | Zenith | ................... | H04N 5/4401 348/E5.108 |
| 6,675,387 B1 * | 1/2004 | Boucher | ............... | H04N 19/503 370/487 |
| 7,036,083 B1 * | 4/2006 | Zenith | ................ | H04N 7/17318 348/E7.071 |
| 7,085,682 B1 * | 8/2006 | Heller | .................... | G06Q 30/02 702/186 |
| 7,409,422 B2 * | 8/2008 | Christian | ............... | G06Q 30/02 707/999.01 |
| 7,441,199 B2 * | 10/2008 | Zenith | ................ | H04N 7/17318 348/E7.071 |
| 7,581,173 B1 * | 8/2009 | Ferguson | .............. | G06F 16/957 715/235 |

(Continued)

OTHER PUBLICATIONS

Vincent Lee and Luka Cempre; "Google Analytics tracker for Apple tvOS" by Analytics Pros; 17 pages; Commits on Sep. 14, 2016: https://github.conn/analytics-pros/Swift-GA-Tracker-for-Apple-tvOS/tree/d325127fb3164603351e41b6a5bd321ce7c08bbd (Year: 2016).*

(Continued)

*Primary Examiner* — Scott T Baderman
*Assistant Examiner* — Benjamin Smith
(74) *Attorney, Agent, or Firm* — Brake Hughes Bellermann LLP (57) ABSTRACT

Techniques for tracking pages accessed by an app executed to display multiple pages on a display. A computing device loads the app and present content from the app on a display. The computing device is configured to display individual pages of the app using declarative code specifying appearances of the pages. The computing device is configured to respond to events using page-generic imperative code. The computing device renders a page on the display using the declarative code of the page and identifies a tracking tag in the declarative code of the page. Based on identifying the tracking tag, the computing device sends a message to an analytics system identifying a page access.

11 Claims, 8 Drawing Sheets

(56) References Cited

U.S. PATENT DOCUMENTS

| | | | | |
|---|---|---|---|---|
| 7,941,525 | B1* | 5/2011 | Yavilevich | G06Q 30/02 709/203 |
| 7,970,891 | B1* | 6/2011 | Kontothanssis | G06Q 30/02 709/224 |
| 7,979,457 | B1* | 7/2011 | Garman | G06Q 10/02 707/768 |
| 8,307,101 | B1* | 11/2012 | Mui | G06Q 10/063 709/229 |
| 8,359,313 | B2* | 1/2013 | Mui | G06F 16/958 707/736 |
| 8,429,243 | B1* | 4/2013 | Wang | G06F 16/958 709/217 |
| 8,640,037 | B2* | 1/2014 | Goodwin | G06F 3/0484 715/760 |
| 8,713,424 | B1* | 4/2014 | Kuhn | G06F 40/14 715/234 |
| 8,725,794 | B2* | 5/2014 | Kandasamy | G06Q 30/02 709/203 |
| 8,756,211 | B2* | 6/2014 | Trieloff | G06Q 30/02 707/706 |
| 8,938,491 | B1* | 1/2015 | Colton | G06F 9/54 709/203 |
| 8,996,986 | B2* | 3/2015 | Manion | G06F 8/61 709/203 |
| 8,997,081 | B1* | 3/2015 | Manion | G06F 8/65 717/168 |
| 9,208,251 | B2* | 12/2015 | Mawhinney | G06F 16/9535 |
| 9,219,787 | B1* | 12/2015 | Manion | H04L 67/142 |
| 9,432,482 | B2* | 8/2016 | Ding | H04L 67/1095 |
| 9,508,081 | B2* | 11/2016 | Yavilevich | G06Q 30/02 |
| 9,553,918 | B1* | 1/2017 | Manion | G06F 16/00 |
| 9,608,892 | B2* | 3/2017 | Ding | H04L 43/0876 |
| 9,712,618 | B2* | 7/2017 | Ding | G06F 16/95 |
| 9,948,749 | B2* | 4/2018 | Manj | H04L 67/34 |
| 10,061,860 | B2* | 8/2018 | Daly, Jr. | G06F 16/972 |
| 2004/0205119 | A1* | 10/2004 | Streble | G06Q 30/00 709/203 |
| 2005/0044139 | A1* | 2/2005 | Christian | G06Q 30/02 709/203 |
| 2006/0130109 | A1* | 6/2006 | Zenith | H04N 7/17318 725/110 |
| 2008/0162257 | A1* | 7/2008 | Garg | G06Q 30/02 705/14.41 |
| 2008/0209320 | A1* | 8/2008 | Mawhinney | G06F 16/9535 715/700 |
| 2009/0327353 | A1* | 12/2009 | Zhuge | G06F 11/3419 |
| 2011/0093461 | A1* | 4/2011 | Mui | G06F 16/958 707/736 |
| 2011/0185016 | A1* | 7/2011 | Kandasamy | G06Q 10/06 709/203 |
| 2011/0213822 | A1* | 9/2011 | Yavilevich | G06Q 30/02 709/202 |
| 2011/0282739 | A1* | 11/2011 | Mashinsky | G06Q 30/02 705/14.53 |
| 2012/0047427 | A1* | 2/2012 | Hauser | G06F 3/03543 715/234 |
| 2013/0031470 | A1* | 1/2013 | Daly, Jr. | G06F 16/9535 715/243 |
| 2013/0117358 | A1* | 5/2013 | Ricard | G06F 21/316 709/203 |
| 2013/0263023 | A1* | 10/2013 | Goodwin | G06F 3/0484 715/760 |
| 2013/0304906 | A1* | 11/2013 | Yavilevich | H04L 67/22 709/224 |
| 2014/0032577 | A1* | 1/2014 | Trieloff | G06Q 30/02 707/756 |
| 2014/0222553 | A1* | 8/2014 | Bowman | G06Q 30/0276 705/14.45 |
| 2015/0067089 | A1* | 3/2015 | Rajan | H04L 67/14 709/213 |
| 2015/0073868 | A1* | 3/2015 | Garman | G06Q 10/02 705/7.31 |
| 2015/0161083 | A1* | 6/2015 | Ding | H04L 43/0876 715/205 |
| 2015/0163116 | A1* | 6/2015 | Ding | H04L 43/0876 709/224 |
| 2015/0172150 | A1* | 6/2015 | Ding | H04L 67/02 709/203 |
| 2015/0220235 | A1* | 8/2015 | Tully | G06Q 30/0271 715/760 |
| 2015/0220502 | A1* | 8/2015 | Tully | G06F 11/3082 715/242 |
| 2015/0317374 | A1* | 11/2015 | Petitclerc | G06Q 10/067 707/603 |
| 2015/0317573 | A1* | 11/2015 | Petitclerc | G06Q 10/067 705/7.11 |
| 2016/0036930 | A1* | 2/2016 | Green | H04L 67/22 709/224 |
| 2016/0147761 | A1* | 5/2016 | Sivertson | G06F 16/3329 705/31 |
| 2016/0239506 | A1* | 8/2016 | Wu | H04L 67/02 |
| 2016/0269253 | A1* | 9/2016 | Wu | H04L 43/04 |
| 2016/0299748 | A1* | 10/2016 | Scholz | G06F 8/427 |
| 2016/0335316 | A1* | 11/2016 | Riva | G06F 16/2448 |
| 2016/0352828 | A1* | 12/2016 | Ding | H04L 67/42 |
| 2016/0360010 | A1* | 12/2016 | Manj | H04L 67/34 |
| 2017/0078419 | A1* | 3/2017 | Yavilevich | G06Q 30/02 |
| 2017/0091077 | A1* | 3/2017 | Manion | G06F 8/65 |
| 2017/0093917 | A1* | 3/2017 | Chandra | H04L 67/22 |
| 2017/0132182 | A1* | 5/2017 | Manion | G06F 40/14 |
| 2018/0060444 | A1* | 3/2018 | Benge | G06F 16/986 |
| 2018/0074795 | A1* | 3/2018 | Benge | G06F 8/34 |

OTHER PUBLICATIONS

Adobe Target for TVML/TVJS; Apple TV Implementation with tvOS; Adobe® Experience Cloud iOS SDX 4.x for Experience Cloud Solutions; pp. 105-108; Nov. 8, 2018 (Year: 2018).*

Apple Developer Forums: Apple TV Analytics; "integrate analytics to an app on the Apple TV if its built using the TVML-TVJS Templates"; 4 pages; Dec. 16, 2015; https://forums.developer.apple.com/thread/22195 (Year: 2015).*

Jalkut, Daniel; Indie Stack: "Presenting HTML on Apple TV", Sep. 12, 2015; 3 pages; https://indiestack.com/2015/09/presenting-html-on-apple-tv/ (Year: 2015).*

Automatic and enhanced Google Analytics tracking for common user interactions on the web. Retrieved from URL https://github.com/googleanalytics/autotrack on Dec. 27, 2016 (5 pages).

Sclera Declarative Analytics Platform: Simple Code for Complex Analytics. Retrieved from URL http://www.scleradb.com/ on Dec. 27, 2016 (3 pages).

* cited by examiner

```
// Register the custom tag (ADBTrackView) with the TVElementFactory.
// The TVElementFactory is used to register new elements that extend TVML.

TVEElementFactory.registerViewElementClass(ADBTrackStateElement.self, forElementName: "ABDTrackState")

//Register the CustomInterfaceFactory with the TVInterfaceFactory, this class will be responsible for telling the
application what to do when the custom ADBTrackView tag is found on a page.

TVInterfaceFactroy.sharedInterfaceFactory().extendedInterfaceCreator = CustomInterfaceFactory()
```

91 →

```
Class CustomInterfaceFactory: TVInterfaceFactory {
  let kCustomViewTag = 97142 // unlikely to collide
  override func viewForElement(element: TVViewElement, existingView:UIView?) -> UIView? { if element.elementName == "ADBTrackState" { if (existingView != nil && existingView!.tag == kCustomViewTag) {
        return existingView
      } var state:String = "";
      let attributes = element.attributes;
      var data = [String : String]();
      for attribute in attributes! {
        let key = attributes.1 as String
        let value = attribute.1 as String if(key == "state"){
          state = value;
        }else{
          data[key] = value;
        }
      } if(state != ""){
        ADMMobile.trackState(state, data: data);
      }

//Return an empty view..
      let view = UIView();
      return view

} return nil // Don't call super, return nil when you don't want to override anything...
  }
}
```

TELEVISION APPLICATION PAGE TRACKING USING DECLARATIVE PAGE TRACKING

TECHNICAL FIELD

This disclosure relates generally to computer-implemented methods and systems and more particularly relates to improving the efficiency and effectiveness of computing methods and systems that track access to pages of electronic content.

BACKGROUND

Analytics systems track users accessing pages of electronic content such as webpages. Analytics are generally implemented in conventional webpages using page-specific imperative code (e.g., JavaScript) that is provided with the markup code (e.g., Hyper Text Markup Language (HMTL) code) of each of the webpages. The page-specific imperative code of such webpages is configured to provide analytics information to remote analytics servers about the webpages that users access.

Conventional analytics tracking techniques are ill-suited for use in apps that provide content pages without page-specific imperative code. This is because such apps use imperative code to generically provide interactive functionality for multiple pages and this page-generic imperative code has limited access to the page specific-information needed for page tracking. Specifically, the generic imperative code cannot access page-specific information without attempting to access a rendered document object model (DOM) and/or using add-on functions to pass information back and forth between the individual pages and the imperative code. Implementing such access techniques would require complex, error prone, and time-consuming coding, making the use of imperative code for page tracking undesirable.

For example, Apple TV® apps present Apple's Television Markup Language (TVML)-defined pages without using page-specific imperative code. Instead, an Apple TV® app uses a JavaScript file that loads multiple TVML pages and responds to user input on those pages. A different TVML file is used to define the information and image elements that are displayed on the screen for each of the TVML pages. When a button is clicked, a link is clicked, or other event occurs on a page, the event is handled by the JavaScript file. However, because the JavaScript is not specific to the page, it cannot easily track a page access. For example, if a first page includes a list of products with links to additional pages of information about the products and a user selects a Product A link on the first page, the event is passed to a TVML renderer or core TVML and then passed to the app's JavaScript. The JavaScript receives the event and loads a next page identified by a Uniform Resource Locator for the page based on the link, but cannot easily identify the accessed page. Using conventional techniques to track information about the page, such as which product the page relates to and the type of the page, would require extensive coding. Such a requirement is burdensome on the app designer, inefficient, error prone, and otherwise undesirable.

SUMMARY

Embodiments of the invention track pages accessed by an app executed to display multiple pages on a display. A computing device loads the app and presents content from the app on a display. The app is configured to display individual pages using declarative code specifying appearances of the pages. The computing device is configured to respond to events using page-generic imperative code. The computing device renders a page on the display using the declarative code of the page and identifies a tracking tag in the declarative code of the page. Based on identifying the tracking code, the computing device sends a message to an analytics system identifying access to the page. In one specific example, a computing device displaying pages of a merchant's app identifies that the user accessed a product page showing information about a particular product offered by the merchant so that the analytics system is able to track the user's interest in that particular product.

These illustrative features are mentioned not to limit or define the disclosure, but to introduce exemplary features to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Introduction

As discussed above, analytics tracking techniques are ill-suited for use in apps that provide content pages using page-generic imperative code, such as Apple TV® apps. Embodiments of the invention provide improved analytics tracking techniques that use declarative tracking tags within the declarative pages to specify the analytics tracking parameters. Since the analytics tracking is specified within the pages themselves, the tracking tags can access page-specific information and initiate page tracking using that information. The app includes an interface factory that includes page-generic imperative code that finds the tracking code when the pages are rendered and provides the page-specific information from the tracking tags to the analytics system. The app designer does not need to create page-specific imperative code or otherwise code specialized messages to provide page-specific information for analytics. Instead, the app designer is able to create an app with one or more pages that pass analytics data to a separate analytics system by simply including tracking tags in the pages with parameters that identify the information (e.g., Product ID, etc.) from the pages to pass to the analytics system.

Using a declarative programming language (as opposed to an imperative language) to specify the analytics tracking also provides additional advantages. Declarative programming allows the app designer to more simply specify a goal, task, or appearance without having to specify the implementation details of the function. This is in contrast with imperative programming, which implements algorithms in explicit steps. Programming analytics in a declarative programming (as opposed to an imperative language) will generally take less code to accomplish the task and require less sophistication and knowledge on the part of the programmer. For example, consider the following code to track a product page.

s.pageName="Cotton T-Shirt"
    s.prop2="Product Page"
    s.prop3="0422345"
    var s_code=s.t( );if(s_code)document.write(s_code)

Now consider the same tracking but used with a declarative syntax.

<ADBTrackState pageName="Cotton T-Shirt" prop2="Product Page" s.prop3="0422345"/>

These examples of imperative and declarative code specify the same end result, but the declarative code is shorter, simpler, and requires less sophisticated programming knowledge. Embodiments of the invention allow page tracking to be embedded directly into a page without the need for writing a script of imperative code to do the tracking. An app designer can implement analytics tracking with less code and using code that is easier to read and write. Using declarative code also works well with many templating languages, which can be used to further reduce the burden on the app designer and the technical sophistication that is required.

While several of the examples discussed herein describe use of the inventive concepts in the context of TVML apps for Apple TV®, the concepts are applicable to other programming languages including hyper-text-markup-language (HTML), eXtensible Markup language (XML), etc.

Terminology

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, televisions, television set top devices, desktop computers, laptop computers, server computers, tablets, telephones, mobile telephones, portable data assistant (PDA), e-readers, smart watches, and other devices with processing capabilities that provide content for display on televisions, projectors and other displays.

As used herein, the phrase "app" refers to any computer code in one or more files designed to perform a group of coordinated functions, tasks, or activities for a user. Examples of app types include, but are not limited to, media player apps, television channel apps, shopping apps, information access apps, and other content access apps.

As used herein, the phrase "page" refers to refers to a portion of an app that is provided by a particular file of declarative code. For example, a shopping app can, but does not necessarily have, a home page, a product page, a cart page, a checkout page. The type of pages of an app may be limited based on page-type templates provided by an operating environment in which the app will be used. Individual pages of apps can be specified by code that is stored (and provided) separately from the app's general functions and other pages. For example, an app may comprise a homepage with links to server addresses at which other pages of the app can be retrieved.

As used herein, the phrase "page access" refers to a user using a device to retrieve and view electronic content of a particular page. Examples of page access include, but are not limited to, a user viewing a page in an app based on clicking a link, button, or control in prior page, a user viewing a page in an app based on clicking a link, button, or control in an advertisement, text message, or e-mail, etc.

As used herein, the phrase "declarative code" refers to statements or other code in a programming language that allows an app designer to specify a goal, task, or appearance without having to specify procedural steps. TVML, XML, and HTML are examples of programming languages that use declarative code.

As used herein, the phrase "imperative code" refers to any code that changes a program's state using commands or steps for the computer to perform. Imperative code specifies how a program operates, in contrast to declarative code focusing on what a program should accomplish without specifying how the program operates. JavaScript is an example of a programming language that uses imperative code.

As used herein, the phrase "page-generic imperative code" refers to imperative code of an app that is not specific to any particular page or page type of the app. Because the page-generic imperative code is not specific to any particular page or page type of the app, the code could not access page-specific information without using a cumbersome, code-intensive, and/or error prone technique such as by attempting to access a rendered document object model (DOM) and/or using additional functions to pass information back and forth between the individual pages and the imperative code.

As used herein, the phrase "page-specific information" refers to any information that is specific to a particular page of an app. Examples of page-specific information include, but are not limited to, a page's type, status, title, text, links, buttons, and information provided by a user on the page.

As used herein, the phrase "interface factory" refers to an object for creating interface objects. For example, a device used to provide apps can include an interaction module with standard interface code that specifies general interface responses and also include a custom interface factory that apps can use to extend the general interface responses. As a particular example, an app registers a tracking tag and interface code that specifies how the device will respond when the tracking code is encountered in the app.

Examples of Declarative Page Tracking

Figure 1:
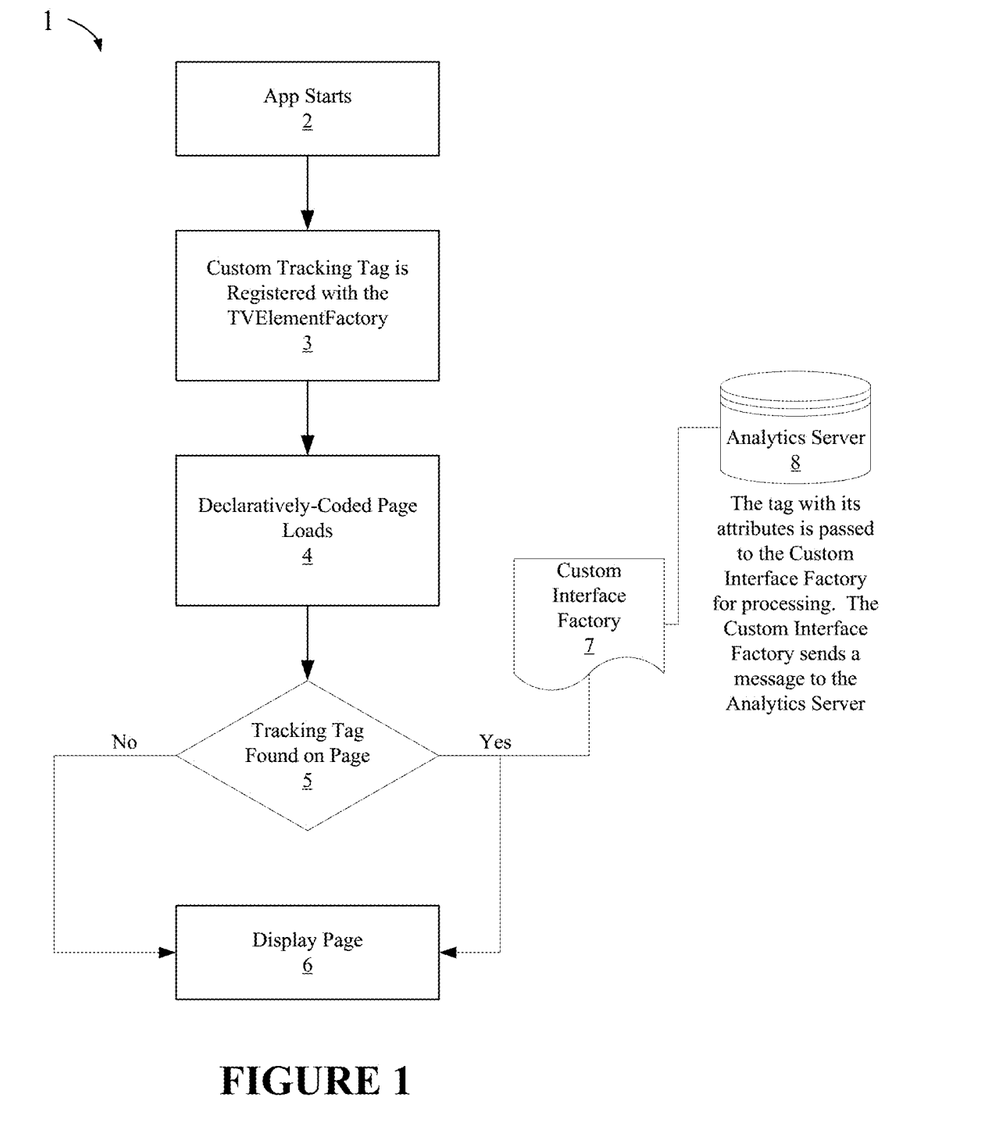
FIG. 1 is a flow chart illustrating an exemplary method of declarative page tracking.

FIG. 1 is a flow chart illustrating an exemplary method 1 of declarative page tracking. In method 1, an app starts, as shown in block 2, for example based on a user choosing to launch the app in a menu of multiple apps. After the app starts, a custom tracking tag is registered with a TVElementFactory, as shown in block 3. This tells a rendering/interactivity module used to render pages of the app that the pages include a tracking tag. It also tells the rendering/interactivity module that custom code will be used to respond to the presence of the tracking tag in the declarative code of pages of the app. In embodiments using TVML pages of an Apple TV® app, a custom tracking tag (e.g., ADBTrackView) is registered with Apple TV®'s TVElementFactory. The TVElementFactory is used to register new elements that extend Apple TV®'s markup language (TVML). In this example a Custom Interface Factory is also registered with the Apple TV®'s TVInterfaceFactory to specify a class that will be responsible for telling the app and renderer/interactivity module how to respond when the custom tracking tag is found on a page. When the tag is encountered on the page the Apple TV®'s rendering/interactivity module will defer to the Custom Interface Factory to decide what to do with it. In one example, the Custom Interface Factory class loops through all the attributes on the tag and make sends a message to an analytic system's API.

After method 1 registers the custom tracking tag with the TVElementFactory, declaratively-coded pages are loaded and displayed consecutively as the user navigates within the app. In block 4, a declaratively-coded page loads and, in block 5, the method checks to determine if the tracking tag is found on the page. If the tracking tag is not found, method 1 displays the page in block 6. If the tracking tag is found, method 1 displays that page in block 6 and the tag with its attributes is passed to the custom interface factory for processing, as shown in block 7. Custom code registered with the custom interface factory specifies how to respond to the presence and attributes of the tracking tag. In method 1, custom interface factory sends a message to the analytics server 8. The message identifies a page access based on the tracking tag and its attributes. For example, the message can identify that the user accessed a product type page displaying information about a particular product.

Exemplary Computing Environment

Figure 2:
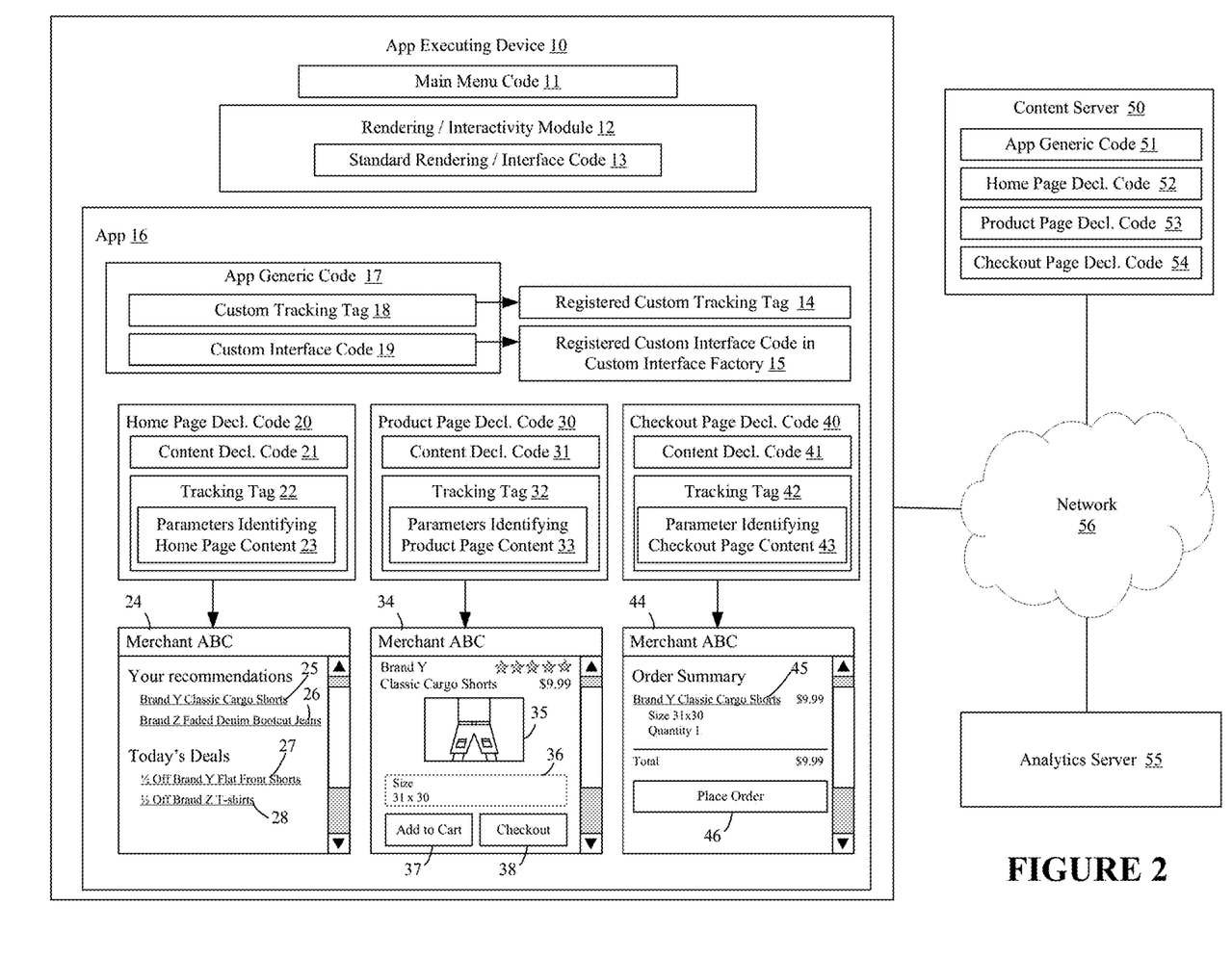
FIG. 2 is a block diagram illustrates an exemplary computing system for declarative page tracking.

FIG. 2 is a block diagram illustrates an exemplary computing system for declarative page tracking. An app executing device 10 of the system is used to present content from one or more apps on a display device. The app executing device 10 includes main menu code 11 that presents a menu that allows a user to download, load, and otherwise use the one or more apps. For example, in this example the user has downloaded app 16 from content server 50 by selecting app using a download feature provided by main menu code 11.

Initially, when the user chose to download the app 16, the app's generic code 51 was downloaded from content server 50 and stored as app generic code 17 on the app executing device 10. This generic code is not specific to any particular page of the app and include the app's generic features (not shown to simplify FIG. 2) and a custom tracking tag 18 and custom interface factory code 19.

The app executing device 10 includes rendering/interactivity module 12 that provides functions that are used by some or all of the apps that are used on the device. For example, rendering and interface features are provided by standard rendering/interface code 12. This code 12 specifies how standard tags used in the declarative code of app pages will be interpreted to render content for the apps.

In the example of FIG. 2, when the user loads the app 16, the custom tracking tag 18 is registered as registered custom tracking tag 14. This registered custom tracking tag 14 identifies that declarative code of pages of apps can include the tracking tag and its attribute format. Below is an example tracking tag, with attributes identifying page-specific information:

<ADBTrackState state="catalog" catalog="${properties.jcr:title}"></ADBTrackState>

In this example, the tag is "ADBTrackState," and attributes provided within the tag identify page specific information, specifically by tracking the state as "catalog" and setting a catalog context variable to the value of the page title. In another example, a product page with tag ADBTrackState is also used in a page to track that the state is "product", and the context data is the "Product ID."

Similarly, the custom interface code 19 is registered in a custom interface factory 15. The registered custom interface code in the custom interface factory 15 is responsible for determining a response when the tracking tag is encountered. For example, if a homepage uses the tracking tag (e.g., ADBTrackState setting one attribute—home), when the rendering/interactivity module 12 encounters the tag, it passes off processing of the tag to the registered custom interface code for the custom interface factory 15. The registered custom interface code for the custom interface factory 15 examines the attributes associated with the tag, and sends a message to an analytics server 55 identifying a corresponding page access. In the ADBTrackState example, the registered custom interface code for the custom interface factory 15 looks for an attribute called "state" to track the state of the page and looks for additional information to be treated as context data. The customer tracking tag 18 and custom interface code 19 are provided via a library that is only usable by app 16 in one embodiment of the invention. Declaratively-coded pages 20, 30, 40 are downloaded, loaded, and displayed one at a time as the user navigates within the app 16. The pages 20, 30, 40 in one example are downloaded as needed. For example, home page declarative code 52 is downloaded from content server 50 and stored for app 16 as home page declarative code 20 when app 16 is launched. Home page declarative code 20 is loaded upon launch of the app and interpreted by the rendering/interactivity module 12 to provide the first view 24 of the app 16 in this example. When the user clicks on a particular link (e.g., link 25) in view 24, product page declaration code 53 is downloaded from content server 50 and stored for app 16 as product page declarative code 30 and then loaded and displayed as view 34 by the rendering/interactivity module 12. Similarly, when the user clicks on a particular button (e.g., the checkout button 38) in view 34, the checkout page declaration code 54 is downloaded from content server 50 and stored for app 16 as checkout page declarative code 40 and then loaded and displayed as view 44 by the rendering/interactivity module 12.

In FIG. 2, the home page declarative code 20 includes content declarative code 21 specifying how the page will appear in view 24, including links 25, 26, 27, and 28. Home page declarative code 20 also includes an instance of the tracking code 22 specifying parameters identifying home page content 23 for tracking when the page is displayed. Product page declarative code 30 includes content declarative code 31 specifying how the page will appear in view 34, including an image 35, user selected pant size information 36, and buttons 37, 38. Product page declarative code 30 also includes an instance of the tracking code 32 specifying parameters identifying product page content 33 for tracking. Checkout page declarative code 40 includes content declarative code 41 specifying how the page will appear in view 44, including link 45 and button 46. The checkout page declarative code 40 also includes an instance of the tracking code 42 specifying parameters identifying checkout page content 43 for tracking.

As the rendering/interactivity module 12 uses the declarative code 20, 30, 40 to render the respective views 24, 34, 44, it identifies the presence of the tracking tags 22, 32, 42 and passes processing of those tags 22, 32, and 42 to the registered custom interface code in the custom interface factory 15. The registered custom interface code in the custom interface factory 15 uses the attributes of the tags 22, 32, 42 to send messages regarding page accesses to the analytics server. In an example in which the user loads the app to display view 24, clicks link 25 to display view 34, selects the pants for purchase and then clicks button 38 to checkout via display 44, several messages are sent to the analytics server 55. When home page declarative code 20 is rendered as the app 16 is first opened, based on tracking tag 22, a message is sent to the analytics server 55 from which the analytics server 55 can determine that the user has opened the app to display the home page view 24. When product page declarative code 30 is rendered based on the selection of link 26, the tracking tag 32 triggers a message to the analytics server 55 from which the analytics server 55 can determine that the user has accessed the product page view 34 for the "Brand Y Classic Cargo Shorts." In this example, the attributes of the tag identify state as "product" and the context using the "Product ID" of the "Brand Y Classic Cargo Shorts". When checkout page declarative code 40 is rendered based on the selection of the button 38, the tracking tag 32 triggers a message to the analytics server 55 from which the analytics server 55 can determine that the user has accessed the checkout page view 44 and provide information about the content of the accessed page.

The registered custom interface code in the custom interface factory 15 is configured to interpret the tracking tag when found in declarative code of pages of the app 16. In one example, the tracking tag identifies multiple attributes. In this example, the registered custom interface code in the custom interface factory 15 pull out the attributes of the tracking tag and, for each attribute, identifies a key and the value. In one specific example of this, the key of the first attribute is state" and value is "product". Based on the key, the registered custom interface code in the custom interface factory 15 determines how to handle the value information. For example, if the key is state, then the registered custom interface code in the custom interface factory 15 uses the information to call a specific analytics system method, such as a method called "track state." Examples of state include, but are not limited to, page view, product view, homepage. Thus, the registered custom interface code in the custom interface factory 15 can determine an appropriate analytics tracking action (e.g., identifying a particular analytics system, function, or method based on the information in the tag). In other words, the information in the tag's attribute can specify the analytics information to be tracked as well as provide information about how the information should be tracked. This, allows the app designer more flexibility in specifying the analytics tracking.

Figure 3:
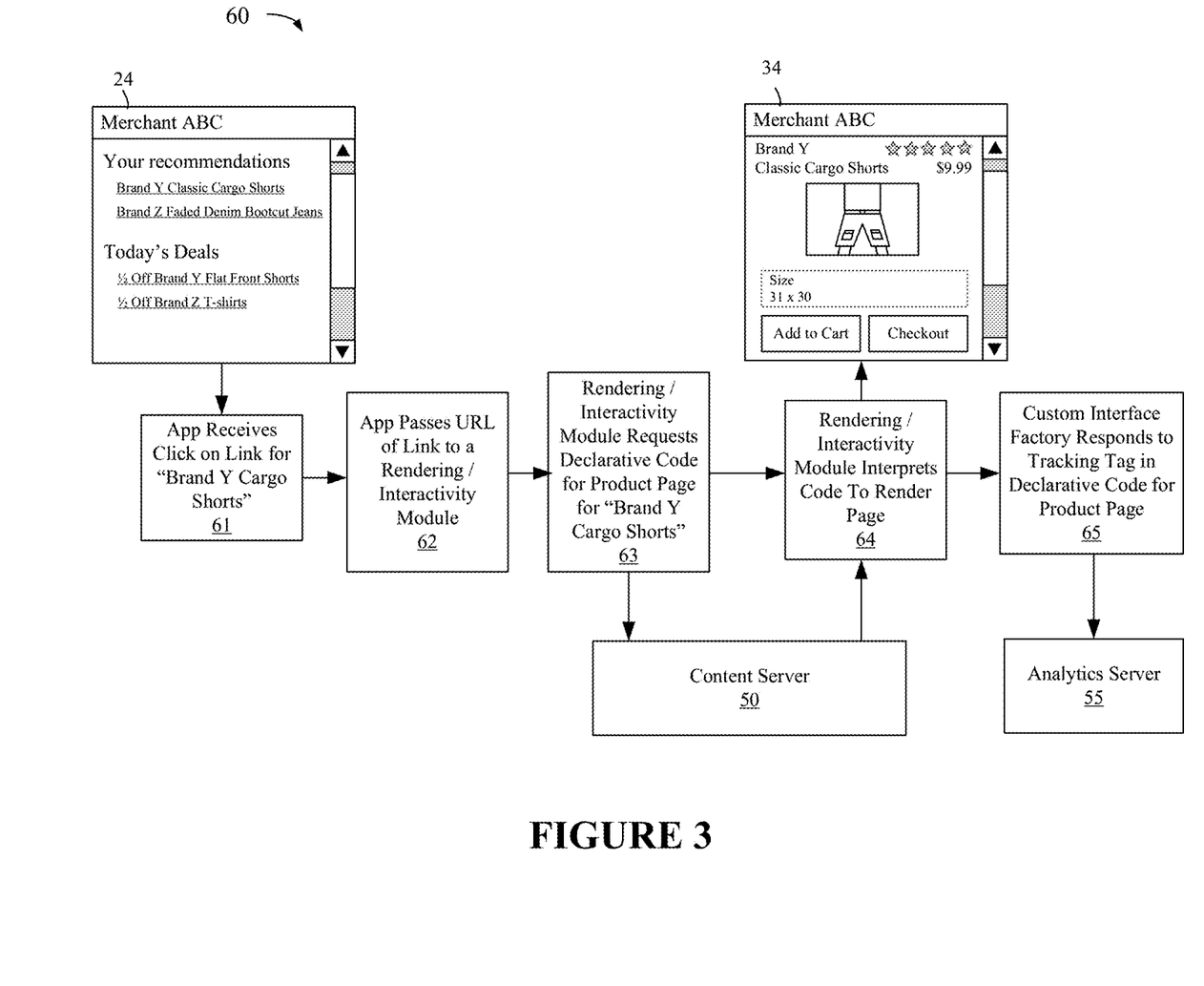
FIG. 3 is a flow chart illustrating an exemplary method of declarative page tracking when a user clicks on a link in one page to access another page of an app.

FIG. 3 is a flow chart illustrating an exemplary method 60 of declarative page tracking when a user clicks on a link in one page to access another page of an app. In this example, view 24 (from FIG. 2) is presented to user by the app. The app receives a click on the link for "Brand Y Cargo Shorts", as shown in block 61, and passes a URL to a rendering/interactivity module, as shown in block 62. The link identifies another page of the app that can be accessed by clicking the link and the URL identifies the network location from which the declarative code of that page can be retrieved. The rendering/interactivity module requests the declarative code for the product page for "Brand Y Cargo Shorts", as shown in block 63, and interprets the code to render the page to show view 34, as shown in block 64. The custom interface factory responds to the tracking code in the declarative code for the product page, as shown in block 65, by sending a message to analytics server 55.

Figure 4:
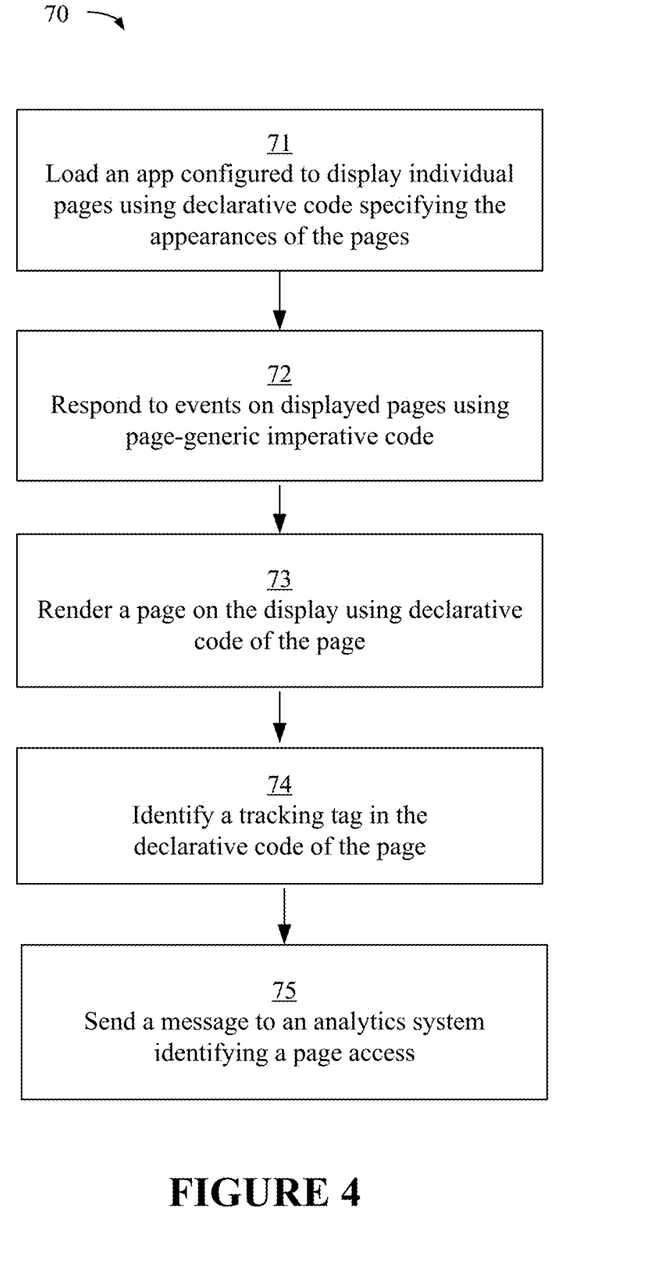
FIG. 4 is a flow chart illustrating an exemplary method of declarative page tracking on a computing device.

FIG. 4 is a flow chart illustrating an exemplary method 70 of declarative page tracking on a computing device. Method 70 can, for example, be performed on the app executing device 10 illustrated in FIG. 2 or on any other suitable computing device. Method 70 loads an app configured to display individual pages using declarative code specifying the appearances of the pages, as shown in block 71. In some embodiments of the invention, the declarative code has a markup language format that may be specific to providing pages in apps on the computing device for display on a separate television. In other embodiments of the invention, the declarative code has a hyper-text markup language (HTML) format.

In some embodiments of the invention, the declarative code is limited to using particular standard functions of the imperative code unless custom tags and associated functions are registered. Some embodiments of the invention involve the app registering a tracking tag with a custom interface factory on the computing device. The custom interface factory is used to register elements that extend the capabilities of the language of the declarative code. In some embodiments of the invention, the app registers interface code for the tracking tag with the custom interface factory. This interface code specifies a response to the tracking tag when found in declarative code of the pages of the app by sending messages to the analytics system. The interface code, for example, may define a class configured to loop through attributes of the tracking tag in rendered pages and trigger requests to an analytics application programming interface (API) using the attributes.

Method 70 further responds to events on displayed pages (i.e., views) using page-generic imperative code, as shown in block 72. Method 70 is able to accomplish page tracking without this page-generic imperative code identifying page-specific information by attempting to access a rendered document object model (DOM) and/or using additional functions to pass information back and forth between the individual pages and the imperative code.

The method 70 renders a page on the display using the declarative code of the page, as shown in block 73, and identifies a tracking tag in the declarative code of the page, as shown in block 74. A message is sent to the analytics system identifying a page access, as shown in block 75, based on identifying and interpreting the tracking tag. In one example, page-generic code identifies a parameter of the tracking tag that identifies page-specific information about the page being displayed on the display. The page-specific information can, for example, identify displayed elements on a page being displayed, a user action taken on a page being displayed. In one specific example, the page-specific information identifies a particular product being promoted by the page or a particular state of the page (e.g., a page view state, product view state, or a homepage state, etc.)

Figure 5:
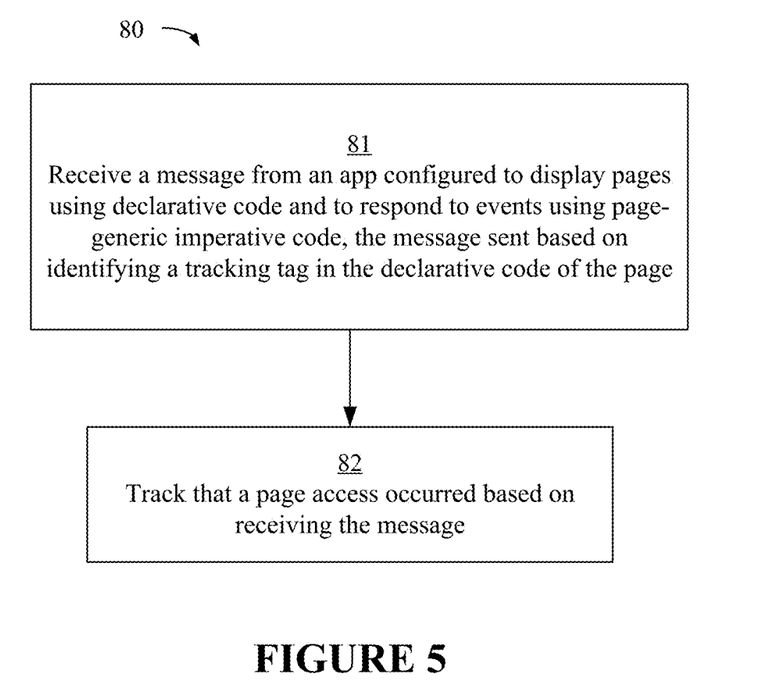
FIG. 5 is a flow chart illustrating an exemplary method of declarative page tracking on an analytics system.

FIG. 5 is a flow chart illustrating an exemplary method 80 of declarative page tracking on an analytics system. Method 80 can, for example, be performed on the analytics server 55 illustrated in FIG. 2 or on any other suitable computing device. Method 80 involves receiving a message from the app configured to display pages using declarative code and to respond to events using page-generic imperative code, the message sent based on identifying a tracking tag in the declarative code of the page, as shown in block 81. The method 80 further involves tracking that a page access occurred based on receiving the message from the app, as shown in block 82. In some embodiments of the invention, messages are received from the app deployed on multiple user devices and page accesses occurring on those devices are tracked based on receiving the messages.

Code Examples

Figure 6:
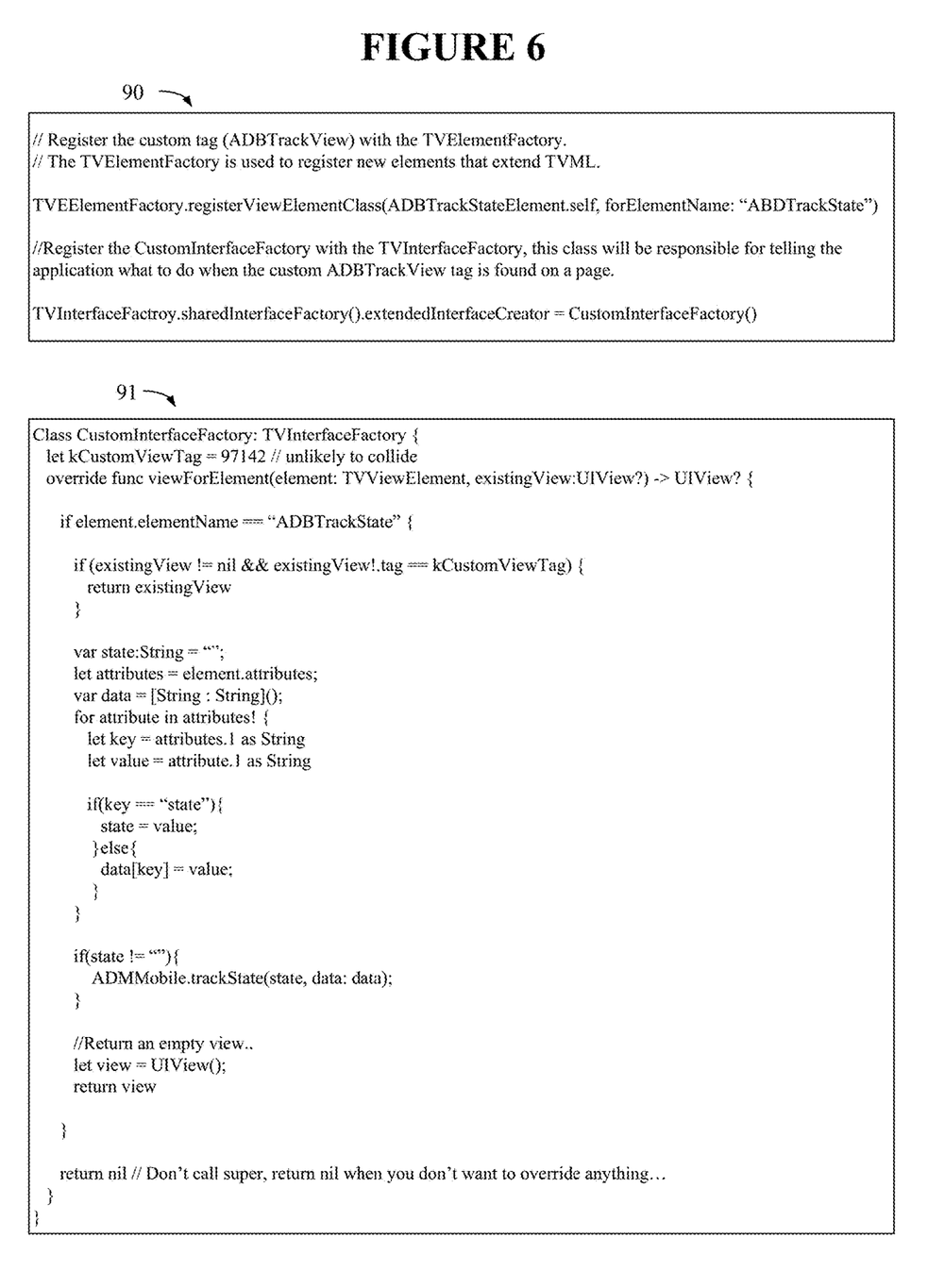
FIG. 6 is a block diagram illustrating exemplary blocks of code for declarative page tracking.
Figure 7:
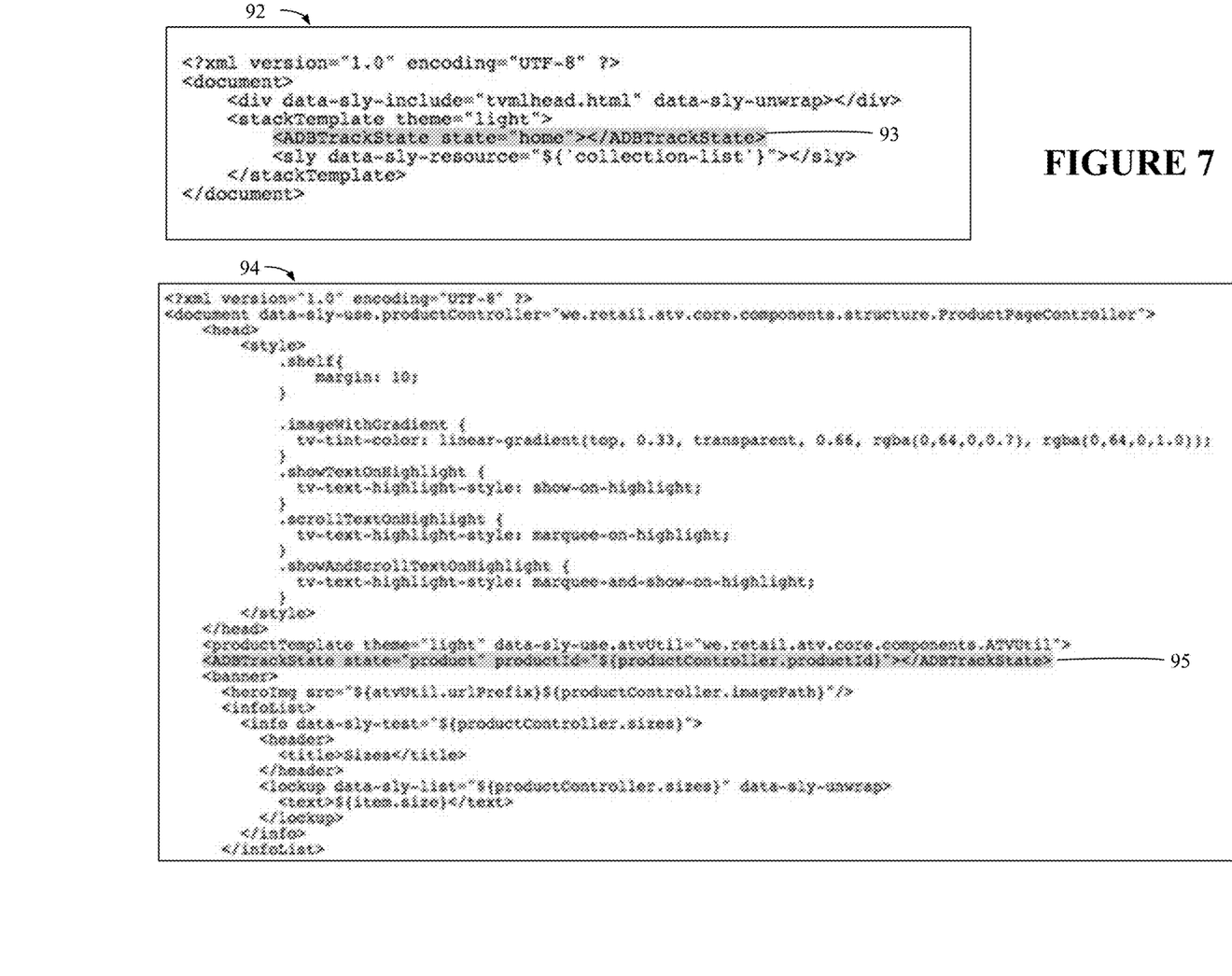
FIG. 7 is a block diagram illustrating exemplary blocks of code for declarative page tracking.

FIG. 6 and FIG. 7 are block diagrams illustrating exemplary blocks of code for declarative page tracking. Code 90 registers a tracking tag and a custom interface factory for responding to the presence of the tracking tag in declarative page code. Code 91 specifies an exemplary class for a custom interface factory. Code 92 illustrates declarative code for a homepage that includes a tracking tag 93 specifying tracking page-specific information. Code 94 illustrates declarative code for a product page that includes a tracking tag 95 specifying tracking page-specific information.

Exemplary Computing Environment

Figure 8:
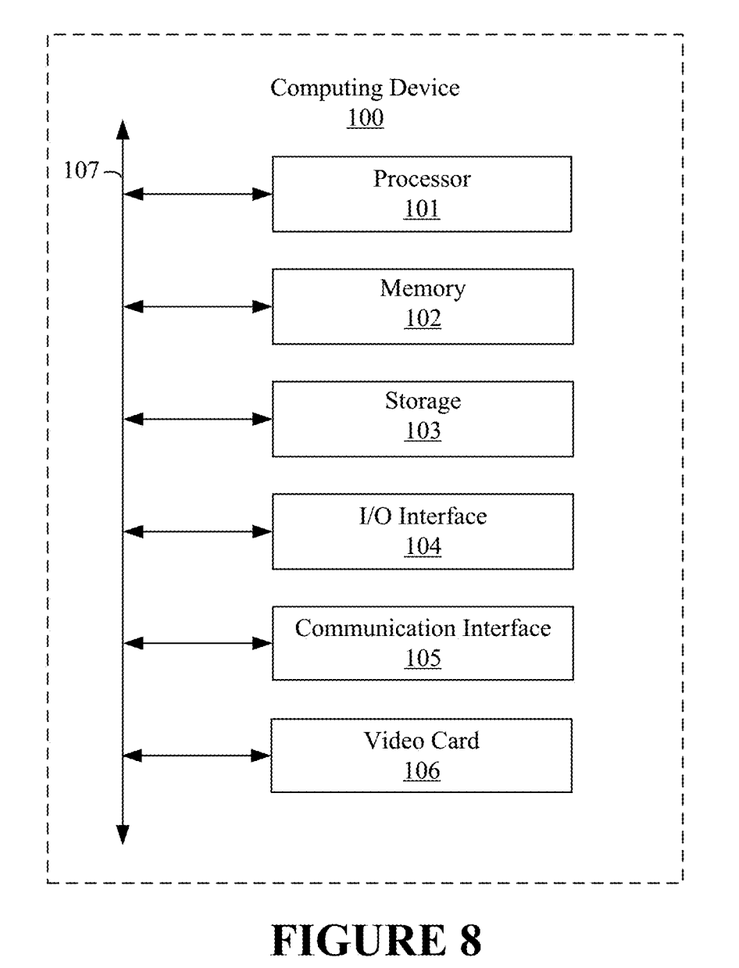
FIG. 8 is a block diagram depicting an example hardware implementation.

Any suitable computing system or group of computing systems can be used to implement the techniques and methods disclosed herein. For example, FIG. 8 is a block diagram depicting examples of implementations of such components. The computing device 100 can include a processor 101 that is communicatively coupled to a memory 102 and that executes computer-executable program code and/or accesses information stored in memory 102 or storage 103. The processor 101 may comprise a microprocessor, an application-specific integrated circuit ("ASIC"), a state machine, or other processing device. The processor 101 can include one processing device or more than one processing device. Such a processor can include or may be in communication with a computer-readable medium storing instructions that, when executed by the processor 101, cause the processor to perform the operations described herein.

The memory 102 and storage 103 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C #, Visual Basic, Java, Python, Perl, JavaScript, and ActionScript.

The computing device 100 may also comprise a number of external or internal devices such as input or output devices. For example, the computing device is shown with an input/output ("I/O") interface 104 that can receive input from input devices or provide output to output devices. A communication interface 105 may also be included in the computing device 100 and can include any device or group of devices suitable for establishing a wired or wireless data connection to one or more data networks. Non-limiting examples of the communication interface 105 include an Ethernet network adapter, a modem, and/or the like. The computing device 100 can transmit messages as electronic or optical signals via the communication interface 105. The computing device 100 can use a video card 106 to provide hardware-accelerated graphics processing or other graphics features. A bus 107 can also be included to communicatively couple one or more components of the computing device 100.

The computing device 100 can execute program code that configures the processor 101 to perform one or more of the operations described above. The program code can include one or more modules. The program code may be resident in the memory 102, storage 103, or any suitable computer-readable medium and may be executed by the processor 101 or any other suitable processor. In some embodiments, modules can be resident in the memory 102. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for tracking pages accessed by an app executed to display multiple pages on a display, the method comprising:
a computing device loading a television (TV) app configured to display individual pages using declarative code specifying appearances of the pages, the computing device configured to respond to events using page-generic imperative code of the TV app, the individual pages including a first page and a second page, the second page being different from the first page and the second page including a tracking tag;
registering, by the TV app, the tracking tag with a custom interface factory, wherein the custom interface factory is used to register elements that extend capabilities of the language of the declarative code;
registering, by the TV app, interface code for the tracking tag with the custom interface factory, the interface code specifying a response to the tracking tag when found in the declarative code of the individual pages, including the second page, by sending a message to an analytics system;
the computing device rendering the first page on the display using declarative code of the first page;
the computing device receiving an input event on the first page and, responsive to the input event, rendering the second page on the display using declarative code of the second page;
responsive to rendering the second page, the computing device identifying the tracking tag in the declarative code of the second page, wherein:
the declarative code is television markup language (TVML) and the tracking tag is a declarative tracking tag in the TVML of the second page,
the tracking tag identifies multiple attributes with each attribute having a key and a value,
the attributes specify analytics information to be tracked and information on how to track the analytics information and the key of at least one of the attributes is state, and
the page-generic imperative code of the TV app identifying a parameter of the tracking tag that identifies page-specific information about the second page including a particular state of the second page, wherein the particular state of the second page is a page view state, a product view state, or a homepage state; and
based on identifying the tracking tag and rendering the second page, the computing device sending a message to the analytics system identifying a page access of the second page when the second page is rendered using the at least one of the attributes of the tracking tag and triggering a specific analytics tracking action based on the key and the value of the at least one attribute.

2. The method of claim 1, wherein the page-specific information identifies that the second page relates to a particular product.

3. The method of claim 1, wherein the custom interface factory comprises a class configured to loop through attributes of the tracking tag in rendered pages and trigger requests to an analytics application programming interface (API) using the attributes.

4. The method of claim 1, wherein the declarative code has a markup language format that is limited to using particular functions of the imperative code.

5. The method of claim 1, wherein the declarative code has a markup language format specific to providing pages in apps on the computing device for display on a separate television.

6. The method of claim 1, further comprising the computing device providing access to multiple client server apps, wherein each of the apps provides an interface for selecting and viewing pages provided from a remote content management server.

7. The method of claim 1, wherein the tracking tag is used by an imperatively-coded function that initiates the message to the analytics server.

8. The method of claim 1, wherein page tracking is performed without the page-generic imperative code identifying page-specific information by accessing a rendered document object model (DOM) or using functions to pass information back and forth between individual pages and the page-generic imperative code.

9. A method for tracking pages accessed by an app executed to display multiple pages on a display, the method comprising:
an analytics server receiving a message from a television (TV) app, the TV app configured to display individual pages using declarative code specifying appearances of the pages, the TV app configured to respond to events using page-generic imperative code of the TV app, wherein the individual pages include a first page and a second page with the first page being different from the second page and the second page includes a tracking tag, the message is sent responsive to receiving an input event on the first page and, responsive to the input event, rendering the second page on the display using declarative code of the second page, identifying and rendering the tracking tag in the declarative code of the second page being rendered by the TV app, wherein:
the declarative code is television markup language (TVML) and the tracking tag is a declarative tracking tag in the TVML of the second page,
the tracking tag identifies multiple attributes with each attribute having a key and a value,
the attributes specify analytics information to be tracked and information on how to track the analytics information and the key of at least one of the attributes is state,
the TV app registers the tracking tag with a custom interface factory, wherein the interface factory is used to register elements that extend capabilities of the language of the declarative code and the TV app registers interface code for the tracking tag with the custom interface factory, the interface code specifying a response of the TV app to the tracking tag when found in declarative code of the individual pages of the TV app by sending messages to the analytics server, and
the page-generic imperative code of the TV app identifying a parameter of the tracking tag that identifies page-specific information about the second page including a particular state of the second page, wherein the particular state of the second page is a page view state, a product view state, or a homepage state; and the analytics server tracking that a page access of the second page occurred based on receiving the message when the second page is rendered using the at least one of the attributes of the tracking tag and triggering a specific analytics tracking action based on the key and the value of the at least one attribute.

10. The method of claim 9, wherein the analytics server receives messages for app deployed on multiple user devices and tracks page accesses occurring based on receiving the messages for the multiple user devices.

11. A system for tracking pages accessed by an app executed to display multiple pages on a display comprising:
   a processor; and
   a non-transitory computer readable medium comprising instructions, wherein, when the instructions are executed by the processor, the processor preforms operations comprising:
      loading a television (TV) app configured to display individual pages using declarative code specifying appearances of the pages, the TV app configured to respond to events using page-generic imperative code of the TV app, the individual pages including a first page and a second page, the second page being different from the first page and the second page including a tracking tag;
      registering the tracking tag with a custom interface factory, wherein the custom interface factory is used to register elements that extend capabilities of the language of the declarative code;
      registering interface code for the tracking tag with the custom interface factory, the interface code specifying a response to the tracking tag when found in the declarative code of the individual pages, including the second page, by sending a message to an analytics system;
      rendering the first page of the TV app on the display using declarative code of the first page;
      receiving an input event on the first page and, responsive to the input event, rendering the second page on the display using declarative code of the second page;
      responsive to rendering the second page, identifying the tracking tag in the declarative code of the second page, wherein:
         the declarative code is television markup language (TVML) and the tracking tag is a declarative tracking tag in the TVML of the second page,
         the tracking tag identifies multiple attributes with each attribute having a key and a value,
         the attributes specify analytics information to be tracked and information on how to track the analytics information and the key of at least one of the attributes is state, and
         the page-generic imperative code of the TV app identifying a parameter of the tracking tag that identifies page-specific information about the second page including a particular state of the second page, wherein the particular state of the second page is a page view state, a product view state, or a homepage state; and
      based on identifying the tracking tag and rendering the second page, sending a message to the analytics system identifying a page access of the second page when the second page is rendered using the at least one of the attributes of the tracking tag and triggering a specific analytics tracking action based on the key and the value of the at least one attribute.

\* \* \* \* \*